United States Patent Office 2,924,302
Patented Feb. 9, 1960

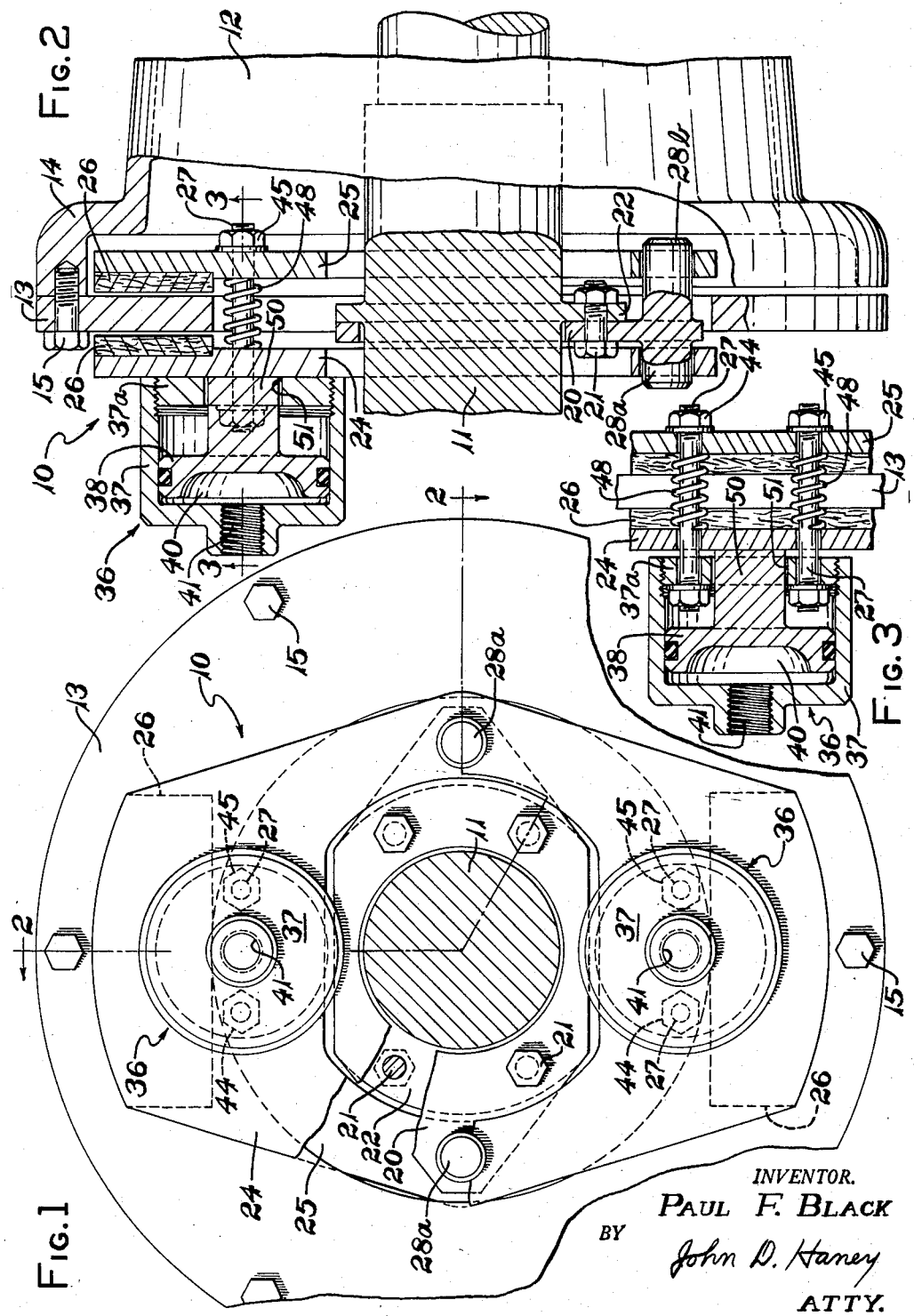

2,924,302

BRAKE MECHANISM

Paul F. Black, Troy, Ohio, assignor to The B. F. Goodrich Company, New York, N.Y., a corporation of New York Application November 10, 1958, Serial No. 772,943

1 Claim. (Cl. 188—73)

This invention relates to an improved brake mechanism and to an assembly of such brake mechanism with a wheel.

The present invention provides a relatively inexpensive, light brake mechanism especially suitable for light low speed aircraft, or for light vehicles and stationary installations on industrial equipment. The brake is a disc type brake of the so-called "spot brake" class in which the rotatable braking member carried by the wheel is a full annulus and the friction surfaces of non-rotatable braking members engageable therewith are equivalent in area to only a small sector of the annular rotatable member. The non-rotatable braking members in this new brake are slidably engaged by means of torque pins to a rigid mounting member which is fastened to the wheel axle structure. These slidable pin-supported members extend generally radially of the wheel to embrace the opposing surfaces of the rotatable member. The pin-supported members are adapted to be shifted axially of the wheel toward each other into engagement with the rotatable braking member by an actuating mechanism which exerts opposing braking force on the pin-supported braking members at a region of each between their points of engagement with the pins and their braking faces.

The brake is preferably actuated hydraulically by mutually engageable actuation members which are supported solely by the movable pin-supported members. The actuation members are particularly designed and arranged so that the brake may be very simply adjusted to compensate for lining wear.

A wheel and brake assembly constructed in accordance with and embodying the present invention is shown in the accompanying drawings.

In the drawings:

Fig. 1 is a view of the wheel and brake assembly looking in the axial direction of the wheel;

Fig. 2 is a cross-sectional view taken on the line 2—2 of Fig. 1, the brake mechanism being shown in released position; and Fig. 3 is a detailed fragmentary cross-sectional view taken on the line 3—3 of Fig. 2 but with the brake parts shown in their engaged position.

The assembly comprises a brake mechanism 10 mounted on an axle structure 11 on which a wheel 12 is mounted for rotation relative to the axle. The wheel 12 carries an annular brake disc 13 secured to one of its bead flanges 14 by bolts 15 so that the disc 13 rotates with the wheel.

The brake mechanism includes a rigid mounting plate 20 which is fastened by bolts 21 to a torque flange 22 which is integral with the non-rotatable axle 11.

The mounting plate 20 has attached to it two non-rotatable lining carrier members 24 and 25 which are parallel each other on opposite sides of mounting plate 20 and which extend radially of the wheel to embrace the opposing plane surfaces of the brake disc 13. Near the outer end of each lining carrier 24 and 25 there is attached a suitable friction lining material 26. The lining carriers 24 and 25, together with their linings 26, are the non-rotatable brake members referred to in the introductory remarks of this specification.

The lining carriers 24 and 25 each have a sliding connection with the mounting plate 20 on pairs of mounting pins 28a and 28b integral with plate 20. As shown in Figs. 1 and 2, the mounting plate 20 has one pair of widely spaced pins 28a projecting away from the wheel on which the outside carrier 24 is mounted, and another pair of pins 28b directed toward the wheel on which the inside lining carrier 25 is mounted. Each carrier is slidable loosely on its respective pair of pins in a direction axially of the wheel and when the carriers are urged together so that their linings 26 engage disc 13, braking torque is transferred through the pins 28a and 28b to the mounting plate 20 and flange 21. In this embodiment of the invention the pins of each pair are widely separated on opposite sides of the axle in the plane of the axle.

The brake is hydraulically actuated by a pair of hydraulic units 36 carried by the lining carriers 24 and 25. Each hydraulic actuating unit 36 includes two main parts, a cup-shaped casing member 37 (see Fig. 2) inside of which a piston member 38 is slidable and is maintained in sealed engagement by peripheral O-ring. Between the piston 38 and the casing 37 there is a fluid chamber 40 and a connection 41 through the casing 37 through which fluid pressure may be introduced into chamber 40.

The casing member 37 includes an associated end closure member 37a which is in threaded engagement with the mouth of the casing member 37. The casing member 37 together with its end closure member 37a is supported only by means of two draw rods 27 which (see Fig. 3) extend loosely through the member 37a and through the adjacent lining carrier 24 and then under or through the center opening of disc 13, and then through the lining carrier 25 in the manner shown in Fig. 3. It may be noted in Fig. 3 that the stud members or draw rods 27 extend loosely through holes in the lining carriers 24 and 25, respectively, and the opposing outer ends of the draw rod are fastened by nuts 44 and 45, respectively. It may be noted in Fig. 1 that the draw rods 27 are parallel to each other and at equal radial distances from the rotational axis of the wheel.

Between the lining carriers 24 and 25 each draw rod is surrounded by a spring 48 which is caged under compression between the lining carriers so as to bias the lining carriers outwardly away from each other. The spring thus urges lining carrier 25 against its retaining nut 44 and urges lining carrier 24 snugly against the bottom of member 37a of the actuation casing 37 when the brake is released as in Fig. 2. Member 37a is not integrally connected to the adjoining lining carrier 24 except by the draw rods 27. The piston member 38 of the actuating mechanism includes a center shank member 50 (Figs. 2 and 3) which extends through an opening 51 in closure member 37a and bears directly against the lining carrier 24 in plane of the draw rod members 27.

The parts of the brake mechanism in Fig. 2 are shown in their normally released position in which the lining carriers 24—25 are spaced away from the opposing radial faces of the disc 13 by the biasing springs 48. In response to the introduction of fluid pressure into chamber 40, the shank portion 50 of the piston member 38 pushes directly against lining carrier 24 and simultaneously the casing member 37 (together with its closure member 37a) moves leftward and thus exerts an axial force on the draw rods 27 in a direction counter to the force exerted by shank 50 of piston member 38. Accordingly, the lining carriers 24 and 25 are shifted simultaneously toward each other along their respective sets of torque pins 28a, 28b to press their friction linings 26 against the opposite sides of the brake disc 13. Normally the casing member 37 and member 37a will be displaced slightly away from the lining carrier 24 when the brake is fully actuated, as shown in Fig. 3. On release of pressure the biasing springs 48 expand to return the parts to the position shown in Fig. 2.

The actuation force applied through the draw rods 27 and through the shank portion 50 of piston 38 is a common plane intermediate the friction lining or braking faces 26 of the lining carriers and their connection with the torque pins 28a and 28b. By applying the braking force in this location to the lining carriers, the outer portions of the carriers radially beyond the force-applying plane tend to deflect somewhat away from the brake disc 13 so that a slightly higher braking pressure is encountered near the inner radial circumference of the brake disc 13 than in the regions near the radial outer margins of the brake disc. This pressure differential in a radial direction across the disc appears to compensate for the fact that the lining wear is normally more severe near the faster moving radially outer portion of the brake disc. Thus wear on the lining members 26 in this brake design is unusually even.

In the fully released position of the actuation mechanism (see Fig. 2), the piston member 38 is seated snugly near the bottom of the casing member 37 and with its shank 50 seated firmly against the lining carrier 24. To adjust this brake to compensate for wear, it is merely necessary to screw the casing member 37 down further and further onto the peripheral threads of the end closure member 37a. By threading the casing member 37 onto member 37a in this manner, the piston 38 and its shank 50 are urged forwardly against the lining carrier 24. At the same time such threading moves the closure member 37a away from the lining carrier 24, thereby drawing the opposing lining carrier 25 to a position wherein its lining 26 is closer to the radial opposing face of the brake disc 13. By this simple threaded adjustment of the casing member 37 both lining carriers may be easily adjusted to compensate for wear of their respective linings 26.

Variations in the construction disclosed may be made within the scope of the appended claims.

I claim:

A wheel and brake assembly comprising a wheel adapted for rotation on a non-rotatable axle mechanism, a braking disc disposed in a plane coaxial with the rotational axis of the wheel and adapted for rotation with the wheel, a brake mounting flange, a brake mounting member engaged with said flange, a pair of non-rotatable brake members embracing opposite sides of said disc, a pair of pin members interconnecting each said non-rotatable brake member with said mounting member for slidable movement of said non-rotatable brake members in parallelism relative to said mounting member and said disc, the pin members of each pair being disposed radially inward from said disc and on diametrically opposite sides of said wheel axis, said non-rotatable braking members including opposing braking faces engageable with opposite sides of said disc, and a pair of brake actuating mechanisms each comprising two inter-engaged actuation members cooperating to define a fluid pressure chamber, a draw rod connected to one of said non-rotatable braking members at a region thereof between its braking face and its pin connection with said mounting member, the draw rod extending through the opposing non-rotatable braking member in the region intermediate its braking face and its pin connection and being attached to one of said actuating members, the other of said actuating members being engaged with the latter said non-rotatable braking member in the region thereof intermediate its respective braking face and its pin connection, and each said actuation mechanism being responsive to the introduction of fluid pressure into said pressure chamber thereof for relative displacement so that said one actuation member through said draw rod pulls one non-rotatable braking member forceably against one side of said rotatable braking disc and so that the other actuation member engages said opposing non-rotatable braking member to push it against the opposite side of said rotatable braking disc, and means embracing said draw rods between said braking members for biasing said members apart from each other.

References Cited in the file of this patent

UNITED STATES PATENTS

| | | |
|---|---|---|
| 2,376,685 | Goepfrich | May 22, 1945 |
| 2,548,008 | Franklin | Apr. 10, 1951 |
| 2,689,024 | Trevaskis | Sept. 14, 1954 |
| 2,835,350 | Butler | May 20, 1958 |

FOREIGN PATENTS

| | | |
|---|---|---|
| 734,856 | Great Britain | Aug. 10, 1955 |